(12) United States Patent
Oh et al.

(10) Patent No.: US 10,085,061 B2
(45) Date of Patent: Sep. 25, 2018

(54) METHODS AND SYSTEMS FOR PRESENTING CUSTOMIZED OPTIONS ON A SECOND DEVICE

(71) Applicant: Rovi Guides, Inc., San Carlos, CA (US)

(72) Inventors: Minah Oh, Los Angeles, CA (US); Danielle Larson, Santa Monica, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 14/291,295

(22) Filed: May 30, 2014

(65) Prior Publication Data

US 2015/0350742 A1 Dec. 3, 2015

(51) Int. Cl.
| | | |
|---|---|---|
| G06F 3/00 | (2006.01) | |
| G06F 13/00 | (2006.01) | |
| H04N 5/445 | (2011.01) | |
| H04N 21/442 | (2011.01) | |
| H04N 21/41 | (2011.01) | |
| H04N 21/472 | (2011.01) | |
| H04N 21/81 | (2011.01) | |

(52) U.S. Cl.
CPC ... *H04N 21/44222* (2013.01); *H04N 21/4126* (2013.01); *H04N 21/472* (2013.01); *H04N 21/8153* (2013.01)

(58) Field of Classification Search
CPC ......... H04N 21/44222; H04N 21/4126; H04N 21/472; H04N 21/8153
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 2002/0174430 A1 | 11/2002 | Ellis et al. | |
| 2003/0110499 A1 | 6/2003 | Knudson et al. | |
| 2005/0131856 A1* | 6/2005 | O'Dea | G06F 3/0482 |
| 2005/0251827 A1 | 11/2005 | Ellis et al. | |
| 2010/0153885 A1 | 6/2010 | Yates | |
| 2014/0267911 A1* | 9/2014 | Grant | H04N 21/42222 348/563 |

* cited by examiner

*Primary Examiner* — Yassin Alata
(74) *Attorney, Agent, or Firm* — Haley Guiliano LLP

(57) ABSTRACT

Methods and systems are described herein for a media guidance application that generates for display icons on a second device, in which the icons represent options to perform one or more available media guidance application operations on a first device, and in which the options associated with the icons are selected based on the frequency of use with which the option is used on the first device.

20 Claims, 8 Drawing Sheets

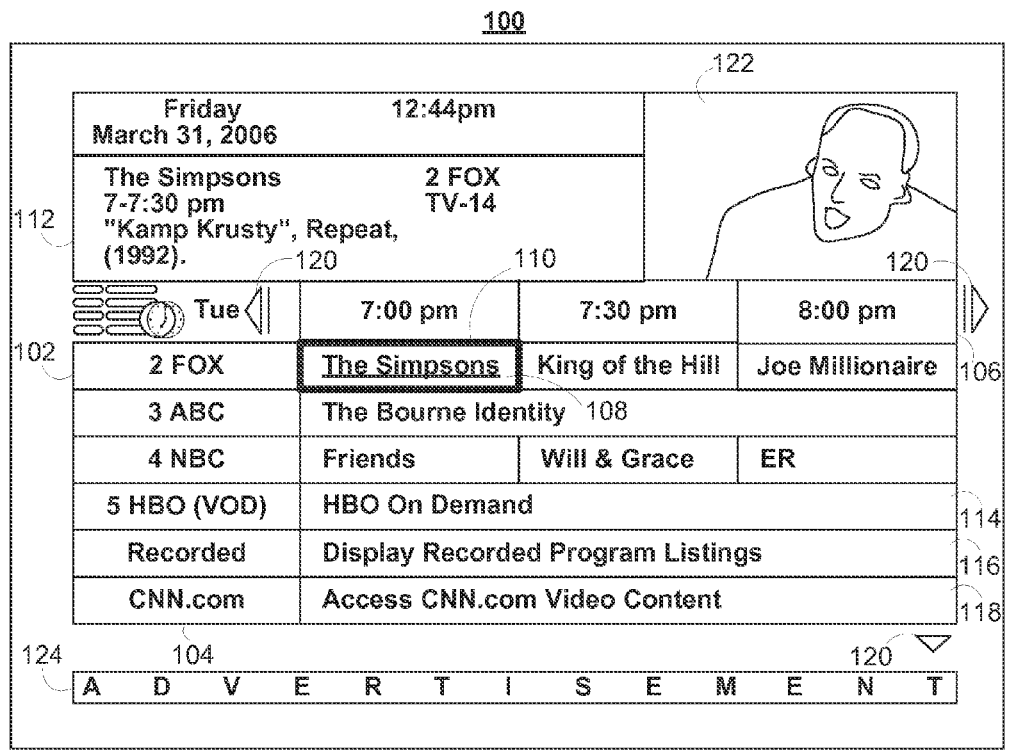
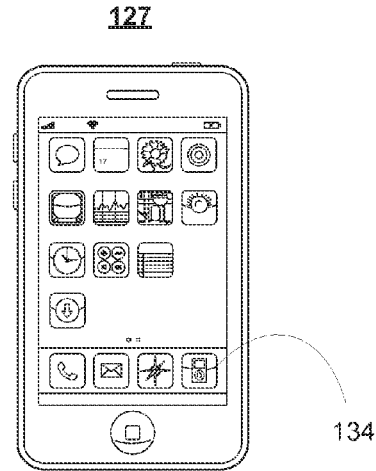
FIG. 1A

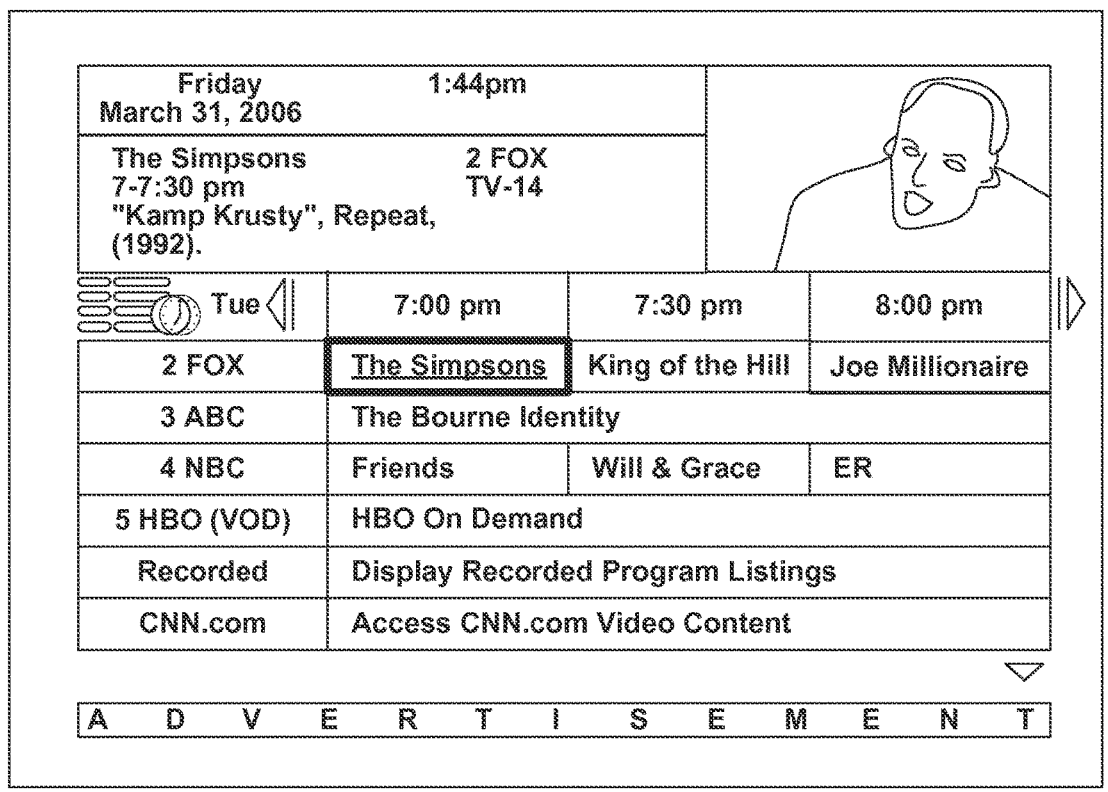
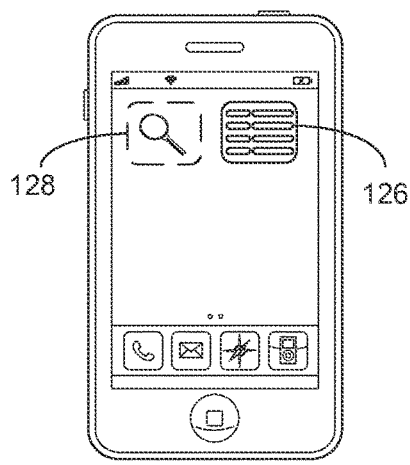
FIG. 1C

500

502
Determine a first device is currently generating for display an user interface that includes an option for performing a media guidance application operation 504
Determine a frequency of use of the option, in which the frequency of use indicates how often the option was performed when available to the user at one or more previous times 506
Compare the frequency of use to a threshold frequency 508
In response to determining that the frequency of use corresponds to the threshold frequency, generate for display, on a second device, an icon for performing the option on the first device

FIG. 5

METHODS AND SYSTEMS FOR PRESENTING CUSTOMIZED OPTIONS ON A SECOND DEVICE

BACKGROUND

Traditional video systems often present a user interface through which a user may access one or more features associated with the video systems. For example, a typical interface may include playback options (e.g., play, pause, fast-forward, rewind, etc.) for presenting a video. In many user devices, interfaces composed of physical buttons have substantially given way to on-screen guides and menus. On-screen guides and menus provide increased flexibility for how and when features may be presented as the interfaces are no longer confined to the physical inputs of the user device. However, even with this flexibility, conventional systems still struggle with selecting what features should be presented in various user interfaces. Furthermore, as the complexity of on-screen guides and menus increase, the available operations that may be performed has increased. As such, an on-screen guide or menu may have more operations available than may be presented on-screen.

SUMMARY

Accordingly, methods and systems are described herein for a media guidance application that generates for display icons on a second device, in which the icons represent options to perform one or more available media guidance application operations on a first device, and in which the options associated with the icons are selected based on the frequency of use with which the option is used on the first device. For example, a media guidance application (e.g., implemented on a second device) may detect that a user is interacting with an on-screen guide or menu (e.g., via a user interface) on a first device. In response to detecting that the user is interacting with the first device, the media guidance application may generate several "short-cut" icons or hot-keys on a second user device that are associated with frequently (or infrequently) used media guidance application operations associated with the user. The selected media guidance application operations provide a user with quick access to options associated with one or more media guidance application operations.

Advantageously, the media guidance application allows a user to access popular (or unpopular) media guidance application operations without navigating to an on-screen guide or menu on the first device, without obscuring or otherwise disrupting content on the first device, and without requiring any additional space in the user interface on the first device. Moreover, as the icons generated for display on the second user device are based on the frequency of use of the media guidance application operations, the media guidance application may customize the icons displayed (e.g., to prevent an overcrowding of icons on the second device) based on the media guidance application operations that a user is likely to want or need.

In some aspects, a media guidance application determines a first device is currently generating for display a user interface that includes an option for performing a media guidance application operation. For example, the media guidance application may determine that another device (e.g., a television, set-top box, personal computer, etc.) is currently displaying content to a user via a user interface. The media guidance application may further determine one or more media guidance application operations that may be available to a user while the content is displayed.

The media guidance application then determines a frequency of use of the option, wherein the frequency of use indicates how often the option was performed when available to a user at one or more previous times. For example, the media guidance application may receive information (e.g., from the first device, a user profile associated with the user, a user profile associated with the first device, a media guidance application implemented on the first device, etc.) that indicates the frequency of use of one or more options.

The media guidance application then compares the frequency of use to a threshold frequency. For example, the media guidance application may store one or move threshold frequencies that indicate whether or not the frequency of use of a given media guidance application operation should cause an icon for an option to perform that media guidance application operation to be presented on a second user device.

The media guidance application then generates for display an icon, on a second device, for performing the option on the first device in response to determining that the frequency of use corresponds to the threshold frequency. For example, the media guidance application may present one or more icons on a second device in response to determining that the media guidance application operations associated with those icons are frequently used. In contrast, the media guidance application may not present one or more icons in response to determining that the frequency of use does not correspond to the threshold frequency. For example, the media guidance application may not present one or more icons on the second device in response to determining that the media guidance application operations associated with those icons are not frequently used.

In some embodiments, the media guidance application may present a predetermined number of icons on the second device. For example, the media guidance application may populate a screen on the second device with as many icons as can be fit on the screen of the second device. Therefore, in response to not presenting an icon associated with one media guidance application operation, the media guidance application may present a different icon associated with a different media guidance application operation. In some embodiments, the media guidance application may present all icons that have a media guidance application operation that has a frequency of use that corresponds to a threshold frequency, irrespective of the number of icons presented.

In some embodiments, the first and second device may work in concert to present options for media guidance application operations. For example, the icons on the second user device may complement the options for performing media guidance application operations available through the user interface on the first device. For example, the media guidance application may determine if a corresponding icon is generated for display in the user interface on the first device and remove the corresponding icon in the user interface in response to generating for display the icon on the second device.

Additionally or alternatively, the media guidance application may allow a user to select whether or not a particular media guidance application operation is available (or not available) through the user interface on the first device or the second device. For example, the media guidance application may prompt the user to confirm removal (or addition) of the icon on the second device or the corresponding icon in the user interface on the first device.

In some embodiments, the media guidance application provides the user with feedback related to the frequency of use for each icon generated for display on the second device. For example, the second device may present a plurality of icons, in which each of the plurality of icons is associated with individual frequency of user. For each icon, feedback related to its frequency of use is provided by the media guidance application by modifying the individual visual properties associated with each icon. Based on the varying visual properties, the media guidance application intuitively and non-intrusively indicates the frequency of use to the user.

For example, a media guidance application may generate for display the icons (e.g., corresponding to different media guidance application operations provided by the media guidance application) on the second device. Furthermore, the media guidance application may incrementally decrease the visual properties (e.g., brightness, opaqueness, size, etc.) of an icon suffering from a low frequency of use each time a user interface featuring the option associated with the media guidance application is accessed. After presenting the user interface (and the icon with the incrementally decreasing visual properties on the second device) a particular number of times without receiving a user selection of the icon, the media guidance application may remove the icon from the second device entirely. Alternatively, in response to receiving an increased frequency of use of the icon (e.g., one or more user selections), the media guidance application may incrementally increase the visual properties of the icon (e.g., indicating to the user that the icon is not facing imminent removal from the interface).

In some embodiments, the frequency of use may be based on a number of times the icon was selected (on the second device) or the option was accessed (in the user device on the first device) relative to a number of times the user interface was previously accessed. For example, each time a user interface is accessed, the media guidance application may record whether or not a particular option was used or whether an icon (presented on the second device) was also selected by a user. The number of times the option was used or the icon was selected relative to a number of times the user interface was previously accessed (e.g., represented as a ratio, percentage, etc.) may then be used to determine a frequency of use of the option or icon relative to the number of times the user interface was previously accessed.

Additionally or alternatively, the frequency of use may be based on a length of time that the option was available or the icon was presented, but not selected, at one or more previous times. For example, each time a user interface on the interface is accessed, the media guidance application may clock how long the option was available or the icon was presented without receiving a selection by a user. Additionally, the media guidance application may toll the running of the clock when the user interface featuring the option or the icon is not displayed and resume the clock the next time the interface is accessed. After the media guidance application presents the option or the icon for a particular amount of time (e.g., thirty minutes) without receiving a user selection, the media guidance application may remove the icon on the second user device (or adjust the visual properties of the icon relative to the other icons on the second device).

It should be noted, the systems, methods, apparatuses, and/or aspects described above may be applied to, or used in accordance with, other systems, methods, apparatuses, and/ or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1A shows an illustrative media guidance application for performing media guidance application operations on a first device and a second device featuring an option to present icons associated with performing media guidance application operations on the first device in accordance with some embodiments of the disclosure;

FIG. 1C shows an illustrative media guidance application for performing media guidance application operations on a first device and a second device featuring icons being modified based on the frequency of use of the media guidance application operations associated with the icons in accordance with some embodiments of the disclosure;

FIG. 5 is a flow-chart of illustrative steps involved in generating for display, on a second device, an icon for performing an option on a first device in response to determining that the frequency of use of the option corresponds to the threshold frequency in accordance with some embodiments of the disclosure.

DETAILED DESCRIPTION OF DRAWINGS

Figure 1B:
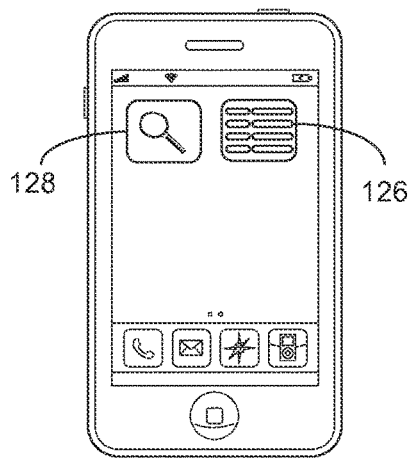
FIG. 1B shows an illustrative media guidance application for performing media guidance application operations on a first device and a second device featuring icons associated with performing media guidance application operations on the first device in accordance with some embodiments of the disclosure.

Methods and systems are described herein for a media guidance application that generates for display icons on a second device, in which the icons represent options to perform one or more available media guidance application operations on a first device, and in which the options associated with the icons are selected based on the frequency of use with which the option is used on the first device. For example, a media guidance application (e.g., implemented on a second device) may detect that a user is interacting with an on-screen guide or menu (e.g., via a user interface) on a first device. The media guidance application may monitor one or more user equipment devices for information indicating that a user is interacting with the one or more user equipment devices. In response to detecting that the user is interacting with the one or more devices, the media guidance application may generate one or more "short-cut" icons or hot keys on a second user device (e.g., the device upon which the media guidance application is implemented) that are associated with frequently (or infrequently) used media guidance application operations.

As used herein, an "interactive media guidance application," "media guidance application," or "guidance application" is an application that provides a user interface that allows users to efficiently navigate, identify, or view content that they may desire. As used herein, a "user interface" is a shared boundary across which two separate components of a computer system exchange information. For example, a user interface may present a user with options to perform one or more media guidance application operations. The user interface may indicate the various options that are available via on-screen icons and/or other notifications, written instructions (e.g., on an input device, in a user manual, etc.), or may not indicate the various options (e.g., relying on a user's previous knowledge of available options).

As referred to herein, a "media guidance application operation" refers to any operation corresponding to providing, receiving, and generating media guidance data for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user (e.g., a user device for monitoring brain activity).

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Other operations of a media guidance application are to play media assets and provide fast access playback operations for those media assets. As referred to herein, the phrase "fast-access playback operations" should be understood to mean any media guidance application operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

Still other operations of media guidance application may include the control of devices used to consume media assets. For example, a media guidance application operation may include turning a device on and off, raising the volume associated with a device, adjusting the display settings of a device, assigning parental controls, transferring information from one device to another, storing and/or recording content, entering authorization information and/or payment information, etc.

In some embodiments, a media guidance application operation may relate to a social media activity such as publicly distributing a notification and/or media assets associated with a user or the video game of the user. For example, the media guidance application may retrieve a list of friends (e.g., a social network buddy list), contacts (e.g., retrieved from a phone/text message/e-mail account associated with the user), and/or other listings featuring other entities with known associations to the user and distribute the notification and/or media assets to contacts. For example, in response to a user input on a device, the media guidance application may post messages to the social network account associated with the user. The message may include a screenshot, recorded segment of a video game, or other media asset that evidences the feat of the user.

As used herein, a "social network" refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate, and select content.

In some embodiments, the media guidance application and/or any instructions for performing any of the embodiments discussed herein may be encoded on machine-readable storage medium. A machine-readable storage medium includes any media capable of storing data. The machine-readable storage medium may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, a media guidance application may generate for display a user interface that includes a plurality of icons each related to an option to perform one or more media guidance application operations. As used herein, an "icon" refers to an image or on-screen object that represents a specific option to perform a media guidance application operation. For example, selecting an icon (e.g., via an on-screen "click") may cause the media guidance application to perform the associated media guidance application operation (e.g., start the associated program and/or open the associated file, directory, or window). For example, selection of an icon associated with accessing a sub-menu will cause the media guidance application to access the sub-menu. Selection of an icon associated with performing a channel browse will cause the media guidance application to perform a channel browse. Selection of an icon associated with viewing a media asset (e.g., a media listing) will cause the media guidance application to generate for display the media asset. For example, user interfaces may include one or more menus, each menu may include icons corresponding to navigational menu items (or simply menu items), navigational links, etc. which may direct a user to a different menu, a sub-menu, a media asset, etc.

In some embodiments, each icon may correspond to one or more different media guidance application operations for which the user has the option to perform. Furthermore, the media guidance application may generate for display user interfaces that groups multiple icons together. Initially, groups of icons may be determined based on default user interface layouts or maps, user profiles, and/or any other source. Additionally or alternatively, the media guidance application may customize these groups and/or the arrangement, position, and/or visual properties associated with the icons.

In some embodiments, a media guidance application determines a first device is currently generating for display a user interface that includes an option for performing a media guidance application operation. For example, the media guidance application may determine that another device (e.g., a television, set-top box, personal computer, etc.) is currently displaying content to a user via a user interface. The media guidance application may further determine one or more media guidance application operations that may be available to a user while the content is displayed.

The media guidance application then determines a frequency of use of the option, wherein the frequency of use indicates how often the option was performed when available to a user at one or more previous times. For example, the media guidance application may receive information (e.g., from the first device, a user profile associated with the user, a user profile associated with the first device, a media guidance application implemented on the first device, etc.) that indicates the frequency of use of one or more options.

As used herein, a "frequency of use" of an option (or icon) refers to an objective measurement of how often a particular option is used. For example, the frequency of use may refer to the number of times that an option to perform a media guidance application operation is used (or not used) while a user interface presenting the option is generated for display, the number of times that an option is used (or not used) within a given period of time, the length of time that an option is presented on a user interface before the option is used, etc. In some embodiments, the frequency of use of an option may be relative to a frequency of use of a user interface in which the option is presented. For example, the frequency of use of an option may be a ratio, percentage, etc., comparing the amount of times that the media guidance application presented a user interface that included the ability to perform the option, but did not receive a user selection to perform the option while the user interface was generated for display. For example, each time a user interface or a particular menu on the user interface is accessed, the media guidance application may record whether or not a particular option (e.g., available via that user interface or particular menu on the user interface) was performed by a user. The performance history (e.g., represented as a ratio, percentage, etc.) may then be used to determine a frequency of use of the option relative to the number of times the user interface was accessed.

Additionally or alternatively, the frequency of use of an option may be relative to an amount of time that the option was presented (or available for use). For example, the frequency of use may indicate an amount of time that the media guidance application presented the option (e.g., thirty minutes), but did not receive a user selection of requesting the performance of the media guidance application operation associated with the option. For example, each time a user interface or a particular menu on the user interface is accessed, the media guidance application may clock how long the option was presented (or available) without receiving a selection by a user. Additionally, the media guidance application may toll the running of the clock when the user interface featuring the option is not displayed and resume the clock the next time the user interface is accessed.

Additionally or alternatively, the frequency of use of an option may be relative to the frequency of use of another option (e.g., presented on the same user interface). For example, the media guidance application may compare how often a particular option is selected versus how often a different option (on the same or different user interface, menu, etc.) is selected. For example, the media guidance application may automatically remove, replace, etc., an option (e.g., a link) associated with the lowest frequency of use on any one user interface.

It should also be noted that a frequency of use associated with an option may be measured in any suitable way and that the techniques above are illustrative and not meant to be limiting.

In some embodiments, the media guidance application may compare one or more frequencies of use of the option (e.g., associated with one or more of the various measurement techniques discussed above) with one or more threshold frequencies. For example, the media guidance application may store one or more threshold frequencies that indicate whether or not the frequency of use of a given media guidance application operation should cause an icon for an option to perform that media guidance application operation to be presented on a second user device.

As used herein, a "threshold frequency" refers to a particular frequency of use that causes the media guidance application to perform an action related to an option with a corresponding frequency of use. A threshold frequency may be measured in any of the techniques described above and/or any technique used to determine a frequency of use of an icon.

Furthermore, the media guidance application may have multiple threshold frequencies, each associated with a different action. For example, a first threshold frequency (e.g., associated with a high frequency of use) may trigger the media guidance application to present an icon with a frequency of use corresponding to the first threshold frequency in a large size (e.g., on a second device). A second threshold frequency (e.g., associated with a normal frequency of use) may trigger the media guidance application to present an icon with a frequency of use corresponding to the second threshold frequency in a normal size (e.g., on a second device). A third threshold frequency (e.g., associated with a low frequency of use) may trigger the media guidance application to present an icon with a frequency of use corresponding to the third threshold frequency in a small size (e.g., on a second device), and a fourth threshold frequency (e.g., associated with a very low frequency of use) may trigger the media guidance application to remove an icon (e.g., on a second device).

It should also be noted that different icons (e.g., associated with different options to perform particular media guidance application operations) may also have different threshold frequencies. In some embodiments, the media guidance application may automatically, or manually (e.g., via prompting the user), assign priorities to different options and/or groups of options. The priority of the option or group of options may affect the threshold frequency selected by the media guidance application. For example, the media guidance application may determine that particular options to perform media guidance application operation are more important and therefore have threshold frequencies that require less frequent use as opposed to other options that are less important and therefore have threshold frequencies that require more frequent use to be maintained on the interface. In another example, an option may be associated with a media guidance application operation that is only used sporadically; therefore, the media guidance application may consider the sporadic nature of the media guidance application operation when determining a threshold frequency for its associated option. In some embodiments, the media guidance application may automatically, or manually (e.g., via prompting the user) assign priorities to different options and/or groups of options.

In some embodiments, the media guidance application may generate for display an icon, on a second device, for performing the option on the first device. For example, the media guidance application may present one or more icons on a second device in response to determining that the media guidance application operations associated with those icons are frequently used. In contrast, the media guidance application may not present one or more icons in response to determining that the frequency of use does not correspond to the threshold frequency. For example, the media guidance application may not present one or more icons on the second device in response to determining that the media guidance application operations associated with those icons are not frequently used.

In some embodiments, the media guidance application may present a predetermined number of icons on the second device. For example, the media guidance application may populate a screen on the second device with as many icons as can be fit on the screen of the second device. Therefore, in response to not presenting an icon associated with one media guidance application operation, the media guidance application may present a different icon associated with a different media guidance application operation. In some embodiments, the media guidance application may present all icons that have a media guidance application operation that has a frequency of use that corresponds to a threshold frequency, irrespective of the number of icons presented.

In some embodiments, the first and second devices may work in concert to present options for media guidance application operations. For example, the icons on the second user device may complement the options for performing media guidance application operations available through the user interface on the first device. For example, the media guidance application may determine if a corresponding icon is generated for display in the user interface on the first device and remove the corresponding icon in the user interface in response to generating for display the icon on the second device.

Additionally or alternatively, the media guidance application may allow a user to select whether or not a particular media guidance application operation is available (or not available) through the user interface on the first device or the second device. For example, the media guidance application may prompt the user to confirm removal (or addition) of the icon on the second device or the corresponding icon in the user interface on the first device.

The icons and user interfaces generated for display by the media guidance application may come in many forms. For example, a user interface may appear as a single screen or may appear as a series of menus and sub-menus, in which various icons and/or groups of icons are generated for display in response to previous user selections on the same or different screen, menu, sub-menu, etc.

In some embodiments, in addition to the media guidance application determining whether or not to present an icon, on a second device, for performing the option on the first device based on the frequency of use of the option, the media guidance application may determine a visual property of the icon.

As used herein, a "visual property" refers to any characteristic of an icon used to indicate to a user the frequency of use of an icon (or a function associated with an icon). For example, a visual property may relate to the size, shape, coloring, opaqueness, brightness, hue, resolution, font, position, and/or any other stylistic or graphical characteristic of the icon. The media guidance application may modify one or more visual properties of the icon (e.g., increasing or decreasing the opaqueness) in order to reflect the frequency of use of an associated option. For example, in response to determining that an option has a low frequency of use, the media guidance application may reduce the brightness, size, or opaqueness of the icon. In contrast, in response to determining that an option has a high frequency of use, the media guidance application may increase the brightness, size, or opaqueness of the icon.

In some embodiments, the modification of a visual property of an icon may be a static process. For example, each time a user interface featuring a particular option is presented, the media guidance application may determine the visual properties associated with the particular icon (e.g., based on a previous frequency of use). The determined visual properties may then be maintained while the user interface is accessed. In some embodiments, even if the frequency of use associated with the particular option is changed (e.g., in response to a user selection) while the user interface is accessed, the media guidance application maintains the determined visual properties of the icon. After the user interface is no longer accessed (e.g., the user interface is closed out by the user, the user device upon which the media guidance application is implemented is powered off, etc.), the media guidance application may then update the visual properties of the particular icon to reflect the change. Accordingly, the next time the user interface is accessed, the media guidance application may present the particular icon with the updated visual properties.

In some embodiments, the modification of a visual property of an icon may be a dynamic process. For example, each time a user interface featuring a particular option is presented, the media guidance application may determine the visual properties associated with the particular icon (e.g., based on a previous frequency of use). The determined visual properties may then be changed while the user interface is accessed. For example, if the frequency of use associated with the particular option is changed (e.g., in response to a user selection) while the interface is accessed, the media guidance application modifies the determined visual properties accordingly. The modified visual properties are then presented while the user accesses the interface.

In some embodiments, the modification of a visual property of an icon may be incremental. For example, the range of values associated with a particular visual property may be divided into multiple increments. Furthermore, the media guidance application may restrict any modification in the current value associated with an option based on an updated frequency of use to a value adjacent to the current value in the range each time the user interface featuring the icon is accessed. For example, if the media guidance application has ten values associated with opaqueness (e.g., with ten equal to entirely opaque and one equal to completely transparent) and the previous value associated with an icon is five (e.g., associated with semi-transparence), the media guidance application may restrict the change in value during the current presentation to either four or six. By requiring any changes to the visual properties associated with an icon to be incremental, a user may access an interface multiple times before the media guidance application makes an icon entirely transparent (and/or removed) all while the declining value of the visual property indicates to the user that the icon may eventually be removed from the user interface. Therefore, when the media guidance application eventually removes the icon (e.g., due to a low frequency of use) a user is not surprised by its absence from the user interface.

In some embodiments, the media guidance application may have additional rules for determining how many values a single modification may traverse. For example, if during a single instance (e.g., the time when an interface was opened to the time when an interface was closed) a user selected a particular option multiple times, the media guidance application may modify the value of the visual property more than if during a single instance a user selected a particular option only once. In such cases, while the media guidance application may modify the visual properties of the icon based on the frequency of use of the option, the modification may not be incremental.

It should also be noted that the embodiments discussed herein with regard to modifying the visual properties of a single icon may also be applied to modifying the visual properties of a group of icons. Groupings of icons may be automatically selected by the media guidance application, manually selected by a user, or by any other suitable means. For example, one or more options be included in a group or subset of option if they are functionally related. For example, icons related to playback operations (e.g., "play," "pause," "re-wind," etc.), although individual icons, may share the same visual properties. Accordingly, if the media guidance application determines to modify the visual properties associated with one icon of the group, the media guidance application may modify the visual properties of all icons in the group. In such cases, the same frequency of use, threshold frequency, etc. associated with one icon would also be associated with all the icons in the group.

In some embodiments, although an icon associated with a particular option is removed (e.g., due to lack of use) from one menu, the icon may also appear on a different menu (e.g., a sub-menu of the menu from which it was removed). For example, unused icons and/or groups of unused icons may be relocated to different sections of a user interface (e.g., a section dedicated specifically to unused icons) or a sub-menu located lower in the menu hierarchy.

With the advent of the Internet, mobile computing, and high-speed wireless networks, users are accessing interfaces on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

FIGS. 1A-C and 2A-B show illustrative display screens that may include the user interfaces, options, and icons discussed herein. The display screens shown in FIGS. 1A-C and 2A-B may be implemented on any suitable user equipment device or platform (e.g., as discussed below). While the interfaces of FIGS. 1A-C and 2A-B are illustrated as full screen displays, they may also be fully or partially overlaid over content being displayed. A user may indicate a desire to access content and/or guide information by selecting a selectable option provided in an interface (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1A shows an illustrative media guidance application for performing media guidance application operations on a first device and a second device featuring an option to present icons associated with performing media guidance application operations on the first device. FIG. 1A shows illustrative grid program listings interface 100 arranged by time and channel that also enables access to different types of content in a single display. Interface 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on demand as streaming content or downloadable content through an Internet web-site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from interface 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Interface 100 may also include video region 122 and advertisement 124. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

FIG. 1A also shows an illustrative media guidance application, implemented on second device 127, for presenting icons associated with options to perform on a first device (e.g., associated with interface 100). In FIG. 1A, icon 134 has been selected. For example, in response to detecting that a user is interacting with another device (e.g., based on the user's proximity to another device as determined by GPS data associated with the user and the other device, based on data received from another device, etc.), the media guidance application may present an icon (e.g., icon 134) associated with presenting icons associated with the option to perform media guidance application operations on the other device.

Additionally or alternatively, the media guidance application may list multiple devices (e.g., connected to a home network) from which a user may select a particular device that a second device may provide icons for performing media guidance application operations. By using a user interface on the second device, the media guidance application may receive a user selection of the other user device.

FIG. 1B shows an illustrative media guidance application for performing media guidance application operations on a first device and a second device featuring icons associated with performing media guidance application operations on the first device. For example, device 132 is currently providing icons (e.g., icons 126 and 128) associated with options to perform media guidance application operations on another device (e.g., associated with interface 130). In some embodiments, icons 126 and 128 may be presented on device 132 in response to determining that options associated with icons 126 and 128 have a high frequency of use.

Icons 126 and 128 may allow the user to access different types of content, media guidance application displays, and/or media guidance application features on another device (e.g., the device associated with interface 130). For example, icons 126 and 128 may be part of a user interface (and other display screens/interfaces described herein). The selectable icons (e.g., icons 126 and 128) may trigger numerous media guidance application operations on another device such as searching for other air times or ways of receiving a program, recording a program, enabling series recording of a program, setting program and/or channel as a favorite, purchasing a program, or other features on another device. Icons 126 or 128 may be available from a main menu display on device 132 and may include icons related to search options, VOD options, parental control options, Internet options, cloud-based options, device synchronization options, second screen device options, options to access various types of media guidance data displays, options to subscribe to a premium service, options to edit a user's profile, options to access a browse overlay, or other options.

FIG. 1C shows an illustrative media guidance application for performing media guidance application operations on a first device and a second device featuring icons being modified based on the frequency of use of the media guidance application operations associated with the icons. For example, FIG. 1C shows interface 150 and device 152. In some embodiments, interface 150 may correspond to interface 130 (FIG. 1B) and appear of a user equipment device separate from device 152.

Device 152 includes icon 126 and icon 128. On device 152, the media guidance application has modified the visual properties of icon 128 based on the frequency of use associated with an option in interface 150 associated with icon 128. For example, in response to determining that the option associated with icon 128 has a low frequency of use, the media guidance application has reduced the opaqueness of icon 128. The increased transparency of icon 128 notifies a user that icon 128 is associated with an option that has a low frequency of use. Additionally, the higher opaqueness of icon 126 (e.g., indicative of a greater frequency of use of an associated icon) helps draw a user's eye to this icon (e.g., increasing the ease of in locating frequently used icons).

For example, a user interface on device 152 may include a plurality of icons, in which each of the plurality of icons is associated with individual visual properties. For each icon, feedback related to the frequency of use of associated option is provided by the media guidance application by modifying the individual visual properties associated with each icon. Based on the varying visual properties, the media guidance application intuitively and non-intrusively indicates the frequency of use (and/or impending removal from the interface) of the icon to the user.

For example, a media guidance application has generated for display interface 150 with a plurality of options (e.g., corresponding to different media guidance application operations provided by the media guidance application) available through interface 150. The media guidance application has modified the visual properties (e.g., brightness, opaqueness, size, etc.) of icon 128 in response to determining that the option associated with icon 128 has a low frequency of use each time an interface featuring the icon is accessed.

In some embodiments, the modification of the visual properties of icon 128 may reflect multiple instances in which interface 150 was generated by the media guidance application without icon 128 being selecting by a user. For example, after presenting interface 150 (and icon 128) a particular number of times without receiving a user selection of icon 128, the media guidance application may have modified the visual properties of icon 128 as shown.

In some embodiments, the frequency of use of the option associated with icon 128 may be stored in a user profile or other location (e.g., memory of a user device upon which the media guidance application is implemented). Each time or instance that the media guidance application generates a display of interface 150, the media guidance application may recall the visual properties associated with each of the icons. For example, a user profile may indicate that an option associated with icon 128 has a low frequency of use. Accordingly, the media guidance application may associate icon 128 with a visual property of semi-transparency. When generating interface 150, the media guidance application may generate for display icon 128 with the semi-transparency shown in interface 150.

The user profile may also store other personalized rules and/or customization associated with the icons. For example, the user profile may store priorities and/or special assignments of threshold frequency (e.g., threshold frequency that differs from a default threshold frequency associated with an option) that are related to a particular option. For example, as stated above, the media guidance application may assign priorities that affect the threshold frequencies and visual properties associated with an icon. The priorities may be stored in the user profile. The user profile may also store custom visual properties associated with the icons. For example, a user may indicate that an icon should flash or blink immediately before it is removed from an interface. This customization may be stored in the user profile and applied to the visual properties generated for display by the media guidance application.

The customization of the interfaces, icons, and options of the media guidance application may additionally or alternatively be based on a user's preferences. A customized media guidance application allows a user to personalize interfaces, icons, and options to create a custom "experience" with the media guidance application. This custom experience may be created by allowing a user to input these customizations and/or by the media guidance application monitoring user activity to determine various user preferences (e.g., interfaces and/or icons frequently used by the user). Users may access their customized media guidance application by logging in or otherwise identifying themselves to the guidance application. Customization of the media guidance application may be made in accordance with a user profile.

The customizations may include varying presentation schemes (e.g., visual properties, groupings, orderings, layouts, etc. associated with interfaces and/or icons), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may also allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Figure 2A:
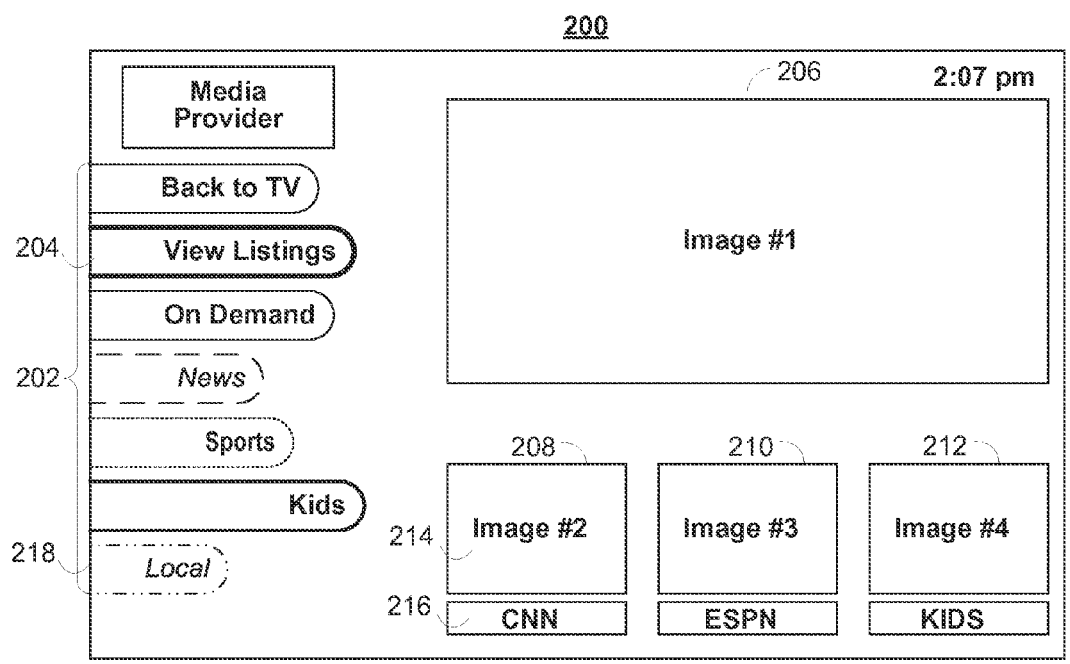
FIG. 2A shows an illustrative media guidance application featuring icons, in which each icon is associated with an individual visual property based on the frequency of use of each icon, in accordance with some embodiments of the disclosure.
Figure 2B:
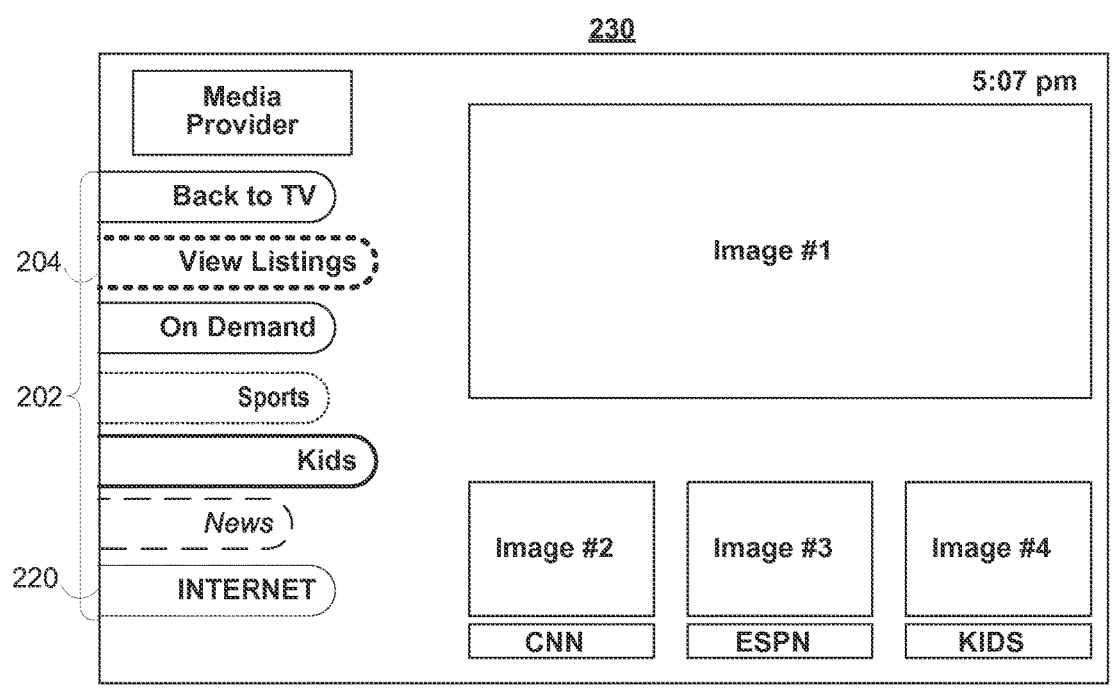
FIG. 2B shows an illustrative media guidance application featuring icons, in which the icons presented are determined based on the frequency of use of each icon in accordance with some embodiments of the disclosure.

Another display arrangement for providing media guidance is shown in FIGS. 2A-B. Video mosaic interface 200 includes selectable icons 202 for content information organized based on content type, genre, and/or other organization criteria. For example, interface 200 may present icons associated with options that have varying amounts of use on another device.

In interface 200, listings 206, 208, 210, and 212 are generated for display. Program listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in interface 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Icons 202 are each associated with individual visual properties. For example, each of icons 202 is associated with a size, font, and opaqueness reflective of the frequency of use of the individual icon. For example, icon 204 is generated for display in a larger size, normal font, and full opaqueness indicating that icon 204 has a high frequency of use. In contrast, icon 218 is generated for display in a small size, in an italicized font, and with semi-transparency indicating that icon 218 has a low frequency of use.

In some embodiments, particular visual properties or values (e.g., in a range) of those visual properties may also indicate additional information besides a low frequency of use. For example, the use of a particular font may indicate that an icon is due to be removed unless the icon is selected during that instance of the interface. In another example, a particular level of opaqueness (e.g., completely opaque) may indicate that an icon is permanently fixed to an interface or menu of an interface (e.g., the icon is not subject to removal based on a low frequency of use). In another example, as shown in icon 220 of FIG. 2B, a capitalization of all letters in an icon may indicate that an icon was recently added to a particular interface and/or menu.

FIG. 2B shows an illustrative media guidance application featuring on-screen icons, in which the icons presented are determined based on the frequency of use of each icon. In some embodiments, interface 230 may correspond to interface 200 (FIG. 2A) after the frequency of use associated with each of icons 202 has changed due to a user either selecting or not selecting one or more of icons 202.

For example, in interface 230, icon 218 (FIG. 2A) has been replaced with icon 220. In addition, the opaqueness associated with icon 204 has changed (e.g., in response to a low frequency of use). In addition, the ordering of icons 202 in interface 230 has changed compared to the ordering of icons 202 in interface 200 (FIG. 2A). For example, each icon may include multiple visual properties and/or other characteristics (e.g., ordering, position in an interface, etc.) associated with the frequency of use of the particular icon. If the media guidance application determines a change to the frequency of use of any one of the icons, the media guidance application may modify the visual properties and/or other characteristics associated with the particular icon.

Figure 3:
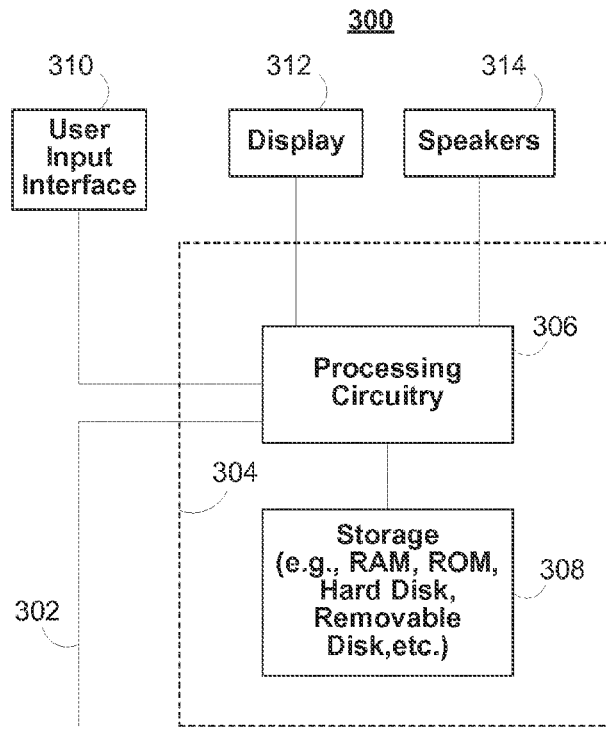
FIG. 3 is a block diagram of an illustrative user equipment device in accordance with some embodiments of the disclosure.

Users may access content and the media guidance application (and its interfaces described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. For example, display 312 may be a touchscreen or touch-sensitive display. In such circumstances, user input interface 310 may be integrated with or combined with display 312. Display 312 may be provided as a stand-alone device or integrated with other elements of user equipment device 300. Display 312 may be one or more of a monitor, a television, a liquid crystal display (LCD) for a mobile device such as amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., on storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on demand by issuing requests to a server remote from the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
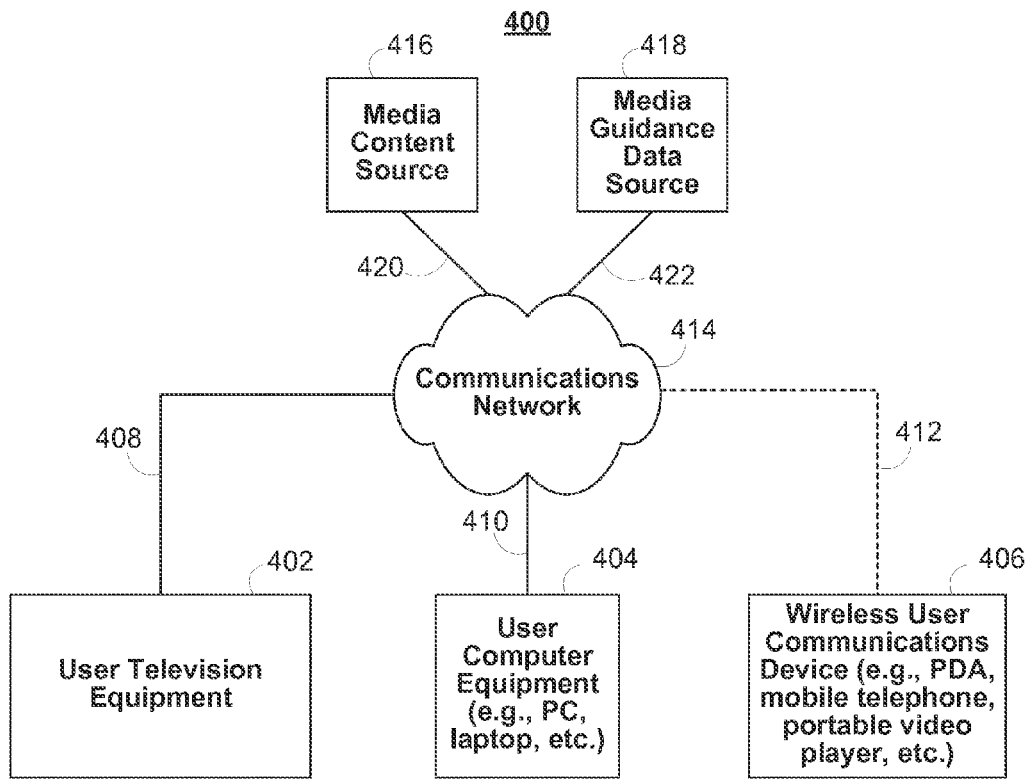
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and a server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition to or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services through which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 is a flow chart of illustrative steps involved in generating for display, on a second device, an icon for performing an option on a first device in response to determining that the frequency of use of the option corresponds to the threshold frequency. It should be noted that process 500, or any step thereof, could be provided by any of the devices shown in FIGS. 3-4. For example, process 500 may be executed by control circuitry 304 (FIG. 3) on user equipment devices 402, 404, and/or 406 (FIG. 4) as instructed by the media guidance application to generate for display, on a second device, an option related to performing a media guidance application operation in an interface (e.g., interface 100 (FIG. 1A), interface 130 (FIG. 1B), interface 150 (FIG. 1C), interface 170 (FIG. 1D), interface 200 (FIG. 2A), and/or interface 230 (FIG. 2B) on a first device. In addition, one or more steps of process 500 may be incorporated into or combined with one or more steps of any other process (e.g., as described in FIG. 6).

At step 502, the media guidance application determines (e.g., via control circuitry 304 (FIG. 3)) a first device (e.g., associated with interface 130 (FIG. 130) [ATTY: PLEASE CHECK.] (FIG. 1B) is currently generating for display a user interface that includes an option for performing a media guidance application operation. For example, the media guidance application may determine that another device (e.g., a television, set-top box, personal computer, etc.) is currently displaying content to a user via a user interface. The media guidance application may further determine (e.g., via control circuitry 304 (FIG. 3)) one or more media guidance application operations that may be available to a user while the content is displayed.

For example, the media guidance application may receive (e.g., via I/O path 302 (FIG. 3)) data describing devices with which the user may be interacting. For example, the media guidance application may receive data (e.g., GPS data) indicating that the user is near a particular user device, may receive data (e.g., connectivity data) indicating one or more devices are connected to a home network, may receive data (e.g., use data) indicating that a device is currently in use, and/or the USER may receive any other data necessary for determining whether or not a user is interacting with a device. In addition, the media guidance application may receive data that indicates what media guidance application operations, if any, are available and/or the use history (e.g., indicating a frequency of use) for those media guidance application operations.

At step 504, the media guidance application determines (e.g., via control circuitry 304 (FIG. 3)) a frequency of use of the option, in which the frequency of use indicates how often the option was performed when available to the user at one or more previous times. The media guidance application may use one or more techniques for determining a frequency of use. For example, the media guidance application may incorporate and/or access a counter or clock component to track the number of times or the length of time interfaces, menus, and/or options are accessed and/or presented. For example, using the counter or clock component, the media guidance application may track the number of times that an option is selected (or not selected) while an interface presenting the option is generated for display, the number of times that an option is used (or not used) within a given period of time, the length of time that an option is presented on a user interface before the option is used, etc.

In some embodiments, the media guidance application may store the frequency of use of one or more options locally (e.g., at storage 308 (FIG. 3) of user equipment devices 402, 404, and/or 406 (FIG. 4)) or remotely (e.g., at media guidance data source 418 (FIG. 4) and/or any other location accessible via communications network 414 (FIG. 4)). For example, the media guidance application may store the current frequency of use associated with each option in a lookup table database. The media guidance application may then cross-reference (e.g., via control circuitry 304 (FIG. 3)) the database in order to retrieve the current frequency of use of an option. Additionally, the media guidance application may edit (e.g., via control circuitry 304 (FIG. 3)) the records associated with a particular option in response to determining (e.g., via control circuitry 304 (FIG. 3)) that the record is out-of-date or that the frequency of use associated with the particular option has been changed (e.g., in response to a user selection of the option).

In some embodiments, the frequency of use of an option may be relative to a frequency of use of a user interface (e.g., interface 100 (FIG. 1A)) in which the option is available. For example, the media guidance application may track e.g., via a counter component incorporated into and/or accessible by control circuitry 304 (FIG. 3)) and/or record (e.g., at storage 308 (FIG. 3)) the frequency of use of an option as a ratio, percentage, or other unit of measurement that compares the amount of times or instances that the media guidance application presented a user interface (e.g., interface 130 (FIG. 1B)) that included an icon (e.g., icon 128 (FIG. 1B)), but did not receive a user selection (e.g., received via user input interface 310 (FIG. 3)) of the option while the user interface was generated for display (e.g., as shown in FIG. 1B).

Additionally or alternatively, the frequency of use of an option may be relative to the amount of time that the option was presented. For example, the media guidance application may track (e.g., via a clock component incorporated into and/or accessible by control circuitry 304 (FIG. 3)) the amount of time that the media guidance application presented, or made available, the option (e.g., five minutes), but did not receive a user selection (e.g., received via user input interface 310 (FIG. 3)) of the option (e.g., icon 204 (FIG. 2A)). For example, each time a user interface (e.g., interface 200 (FIG. 1A)) or a particular menu on the user interface is accessed, the media guidance application may clock (e.g., via control circuitry 304 (FIG. 3)) how long the option was available without receiving a selection by a user. Additionally, the media guidance application may instruct (e.g., via control circuitry 304 (FIG. 3)) the clock component to toll the running of the clock when the user interface featuring the option is not displayed and resume the clock the next time the interface and/or menu is accessed.

Additionally or alternatively, the frequency of use of an option may be relative to the frequency of use of another option (e.g., presented on the same interface). For example, the media guidance application may track (e.g., via a clock or counter component incorporated into and/or accessible by control circuitry 304 (FIG. 3)) how often a particular option is selected versus how often a different option on the same or different interface, menu, etc. is selected. For example, the media guidance application may automatically remove, replace, etc. an option associated with the lowest frequency of use (e.g., icon 218 (FIG. 1A)) on any one interface (e.g., interface 200 (FIG. 2A)).

At step 506, the media guidance application compares (e.g., via control circuitry 304 (FIG. 3)) the frequency of use to a threshold frequency. For example, the media guidance application may compare (e.g., via control circuitry 304 (FIG. 3)) one or more frequencies of use of the option (e.g., associated with one or more of the various measurement techniques discussed above) with one or more threshold frequencies. For example, the media guidance application may compare the frequency of use of each option to one or more threshold frequencies. For example, the media guidance application may compare (e.g., via control circuitry 304 (FIG. 3)) a first icon (e.g., icon 204 (FIG. 2A)) to a first threshold frequency (e.g., associated with a first visual property or a particular value in a range of values associated with the first visual property). The media guidance application may also compare a second option to the first threshold frequency. Additionally or alternatively, the media guidance application may compare the second option to a second threshold frequency (e.g., associated with a second visual property or a particular value in a range of values associated with the second visual property).

For example, the media guidance application may compare different options to different threshold frequencies. In some embodiments, the media guidance may compare different options to different threshold frequencies based on additional factors. For example, the media guidance application may determine that an option associated with a particular function (e.g., ordering pay-per-view) is rarely used. However, based on additional factors (e.g., the function being a source of revenue to a content producer), the media guidance application may apply a lower threshold frequency to the particular option in order to cause the media guidance application to perform an action (e.g., modify the visual properties, remove from a user interface, etc.). In another example, the media guidance application may determine that an option associated with a different media guidance application operation (e.g., editing parental controls) is rarely used. However, based on additional factors (e.g., that the media guidance application operation, although rarely edited/changed, is frequently running in the background of the user interface), the media guidance application may apply a lower threshold frequency to the particular option in order to cause the media guidance application to perform an action (e.g., modify the visual properties, remove from an interface, etc.).

At step 508, the media guidance application, in response to determining that the frequency of use corresponds to the threshold frequency, generates for display on a second device, an icon for performing the option on the first device. For example, in response to determining (e.g., via control circuitry 304 (FIG. 3)) that a frequency of use associated with a particular option corresponds to a threshold frequency, the media guidance application may (e.g., via control circuitry 304 (FIG. 3)) generate for display on a second device, an icon for performing the option on the first device.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 5.

Figure 6:
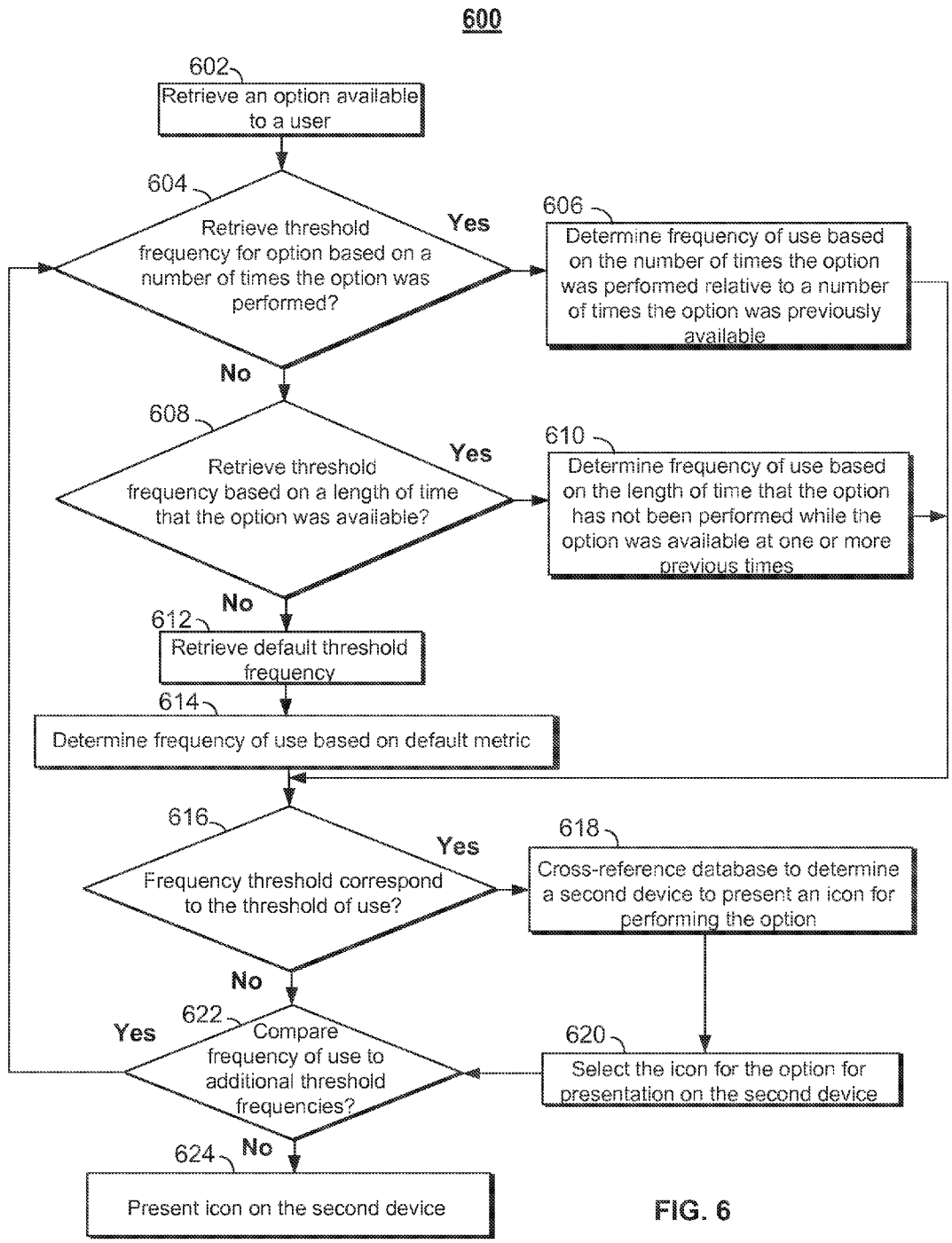
FIG. 6 is a flow-chart of illustrative steps involved in presenting icons on a second device in accordance with some embodiments of the disclosure.

FIG. 6 is a flow-chart of illustrative steps involved in presenting icons on a second device. It should be noted that process 600, or any step thereof, could be provided by, any of the devices shown in FIGS. 3-4. For example, process 600 may be executed by control circuitry 304 (FIG. 3) on user equipment device 402, 404, and/or 406 (FIG. 4) as instructed by the media guidance application to present icons on a second device. In addition, one or more steps of process 600 may be incorporated into or combined with one or more steps of any other process (e.g., as described in FIG. 5).

At step 602, the media guidance application retrieves a an option available to a user. For example, the media guidance application may have received a user request (e.g., via user input interface 310 (FIG. 3)) to generate an interface (e.g., interface 130 (FIG. 1B)) that includes an option to perform a media guidance application operation.

In another example, the media guidance application may retrieve (e.g., via I/O path 302 (FIG. 3)) a listing of all media guidance application operations on a given interface (e.g., interface 100 (FIG. 1A)). of an icon following an instance of an interface. For example, in response to determining (e.g., via control circuitry 304 (FIG. 3)) that a user has opened a user interface, the media guidance application (e.g., via control circuitry 304 (FIG. 3)) may determine the one or more options available from the user interface.

In some embodiments, the media guidance application may store the options available at each user interface locally (e.g., at storage 308 (FIG. 3) of user equipment devices 402, 404, and/or 406 (FIG. 4)) or remotely (e.g., at media guidance data source 418 (FIG. 4) and/or any other location accessible via communications network 414 (FIG. 4)). For example, the media guidance application receive (e.g., via I/O path 302 (FIG. 3)) an indication of a current user interface (or menu) on a first device and may determine the current options associated with the user interface based on a lookup table database. The media guidance application may then cross-reference the database in order to retrieve the list of available options. Additionally, the media guidance application may edit the records associated with a particular option in response to determining (e.g., via control circuitry 304 (FIG. 3)) that the record is out-of-date or that the frequency of use has changed.

At step 604, the media guidance application determines whether or not to retrieve a threshold frequency for an option based on a number of times the option was performed. For example, each time a user interface (e.g., interface 100 (FIG. 1A)) is accessed, the media guidance application may record whether or not a particular option was also used by a user. The number of times the option was selected relative to a number of times the user interface was previously accessed (e.g., represented as a ratio, percentage, etc.) may then be used to determine (e.g., via control circuitry 304 (FIG. 3)) a frequency of use of the option relative to the number of times the user interface was previously accessed. For example, as explained above the media guidance application may determine a frequency of use for a particular option through a variety of techniques. The media guidance application (e.g., via control circuitry 304 (FIG. 3)) may also select a threshold frequency that correspond to the technique used to determine the frequency of use. For example, if the media guidance application calculates (e.g., via control circuitry 304 (FIG. 3)) the frequency of use in terms of number of times the option was selected relative to a number of times the interface was previously accessed, the media guidance application may also select a threshold frequency that identifies the number of times that the option needs to be selected relative to the number of times the user interface is accessed generating an icon, on a second device, associated with performing the option on a first device.

If the media guidance application determines to retrieve a threshold frequency based on a number of times the options was selected, the media guidance application proceeds to step 606 and determines frequency of use based on the number of times the option was performed relative to the number of times the option was previously available. For example, the media guidance application may store (e.g., at storage 308 (FIG. 3)) the number of times (e.g., as determined by a counter component incorporated into and/or accessible by control circuitry 304 (FIG. 3)) a user request (e.g., received via user input interface 310 (FIG. 3)) for an option was received while a user interface (e.g., interface 130 (FIG. 1B)) at which the option was available was displayed. After which, the media guidance application proceeds to step 610.

If the media guidance application determines not to retrieve a threshold frequency based on a number of times the option was selected, the media guidance application proceeds to step 608. At step 608, the media guidance application determines whether or not to retrieve a threshold frequency based on the length of time that the option was available. For example, the media guidance application (e.g., via control circuitry 304 (FIG. 3)) may select a threshold frequency that corresponds to the length of time that the icon was not selected while a user interface through which the option was available was presented. For example, if the media guidance application calculates (e.g., via control circuitry 304 (FIG. 3)) the frequency of use in terms of the length of time (e.g., via a clock component incorporated into and/or accessible by control circuitry 304 (FIG. 3)) that the option was not used while available, the media guidance application may also select a threshold frequency that identifies the minimum length of time that the option needs to be selected within, relative to the amount of time that the user interface is accessed, generating for display, on a second device, an icon associated with performing an option on a first device.

If the media guidance application determines to retrieve a threshold frequency based on the length of time that the option was available, the media guidance application proceeds to step 610. For example, the media guidance application may retrieve (e.g., from storage 308 (FIG. 3) and/or any location accessible via communications network 414 (FIG. 4)) a minimum a length of time (e.g., as measured by a clock component incorporated into and/or accessible by control circuitry 304 (FIG. 3)) before which a user request (e.g., received via user input interface 310 (FIG. 3)) for an option to be performed while the option was available at one or more previous times.

At step 610, the media guidance application determines a frequency of use based on the length of time that the option was available at one or more previous times. For example, each time a user interface (e.g., interface 100 (FIG. 1A)) is accessed, the media guidance application may clock how long the option was available without being used. Additionally, the media guidance application may toll the running of the clock when the user interface featuring the option is not displayed and resume the clock the next time the user interface is displayed. After the media guidance application makes available the option for a particular amount of time (e.g., thirty minutes) without receiving a user selection, the media guidance application may remove an icon associated with the option from a second device.

At step 612, the media guidance application retrieves a default threshold frequency. For example, the media guidance application may determine (e.g., via control circuitry 304 (FIG. 3)) a threshold frequency based on any suitable technique as described herein. After determining the default threshold frequency, the media guidance application proceeds to step 614, and the media guidance application determines the frequency of use based on a metric associated with the default threshold frequency. For example, the media guidance application (e.g., via control circuitry 304 (FIG. 3)) may compare how often a particular option is used versus how often a different option on the same or different interface, menu, etc. is used. For example, the media guidance application may automatically remove, replace, etc. an icon associated with the lowest frequency of use option on any one interface.

At step 616, the media guidance application determines if the frequency threshold corresponds to the threshold of use of the option. For example, in some embodiments, step 616 may correspond to step 506 (FIG. 5)). As described above, the media guidance application may compare (e.g., via control circuitry 304 (FIG. 3)) one or more frequencies of use of the option (e.g., associated with one or more of the various measurement techniques discussed above) with one or more threshold frequencies. For example, the media guidance application may compare the frequency of use of each option to one or more threshold frequencies.

For example, the media guidance application may compare (e.g., via control circuitry 304 (FIG. 3)) a first option to a first threshold frequency. The media guidance application may also compare a second option to the first threshold frequency. Additionally or alternatively, the media guidance application may compare the second option to a second threshold frequency (e.g., associated with removing the icon from a second device).

If the frequency threshold corresponds to the threshold of use of the option, the media guidance application proceeds to step 618. For example, if the frequency of use associated with an option is three selections every ten times a user interface (e.g., interface 100 (FIG. 1A) featuring the option is generated for display, and the threshold frequency is associated with less than four selections every ten times an interface featuring an option is generated for display. The media guidance application may determine (e.g., via control circuitry 304(FIG. 3)) that the frequency of use associated with an option corresponds to the threshold frequency.

At step 618, the media guidance application cross-references a database to determine an effect of correspondence on the icon. For example, in response to determining that a frequency of use associated with a first option corresponds to a threshold frequency, the media guidance application may cross-reference a database (e.g., stored locally at storage 308 (FIG. 3) or remotely at any location accessible via communications network 414 (FIG. 4)) to determine a particular effect the correspondence may have on the presentation of, or the visual properties of, a first icon on a second device.

In some embodiments, the database may also contain additional factors that may affect the presentation of an icon. For example, the database may include rules related to one or more icons that limit the amount or types of icons on the second device.

At step 620, the media guidance application selects the icon for presentation on the second device that is associated with the option. For example, if the media guidance application receives (e.g., via I/O path 302 (FIG. 3)) an output of the database that indicates that, based on the correspondence of the frequency of use of the particular option and the threshold frequency, the media guidance application (e.g., via control circuitry 304 (FIG. 3)) may transmit instructions to present a particular icon.

At step 622, the media guidance application determines whether or not to compare the frequency of use to additional threshold frequencies. For example, in some embodiments, the media guidance application may compare the frequency of use associated with an option to one or more threshold frequencies. In some embodiments, the one or more threshold frequencies may correspond to presentation of different icons on different device. For example, if the frequency of use of the icon corresponds to a first threshold frequency, the icon may be present on all or a subset of user devices associated with a user.

If the media guidance application determines to compare the frequency of use to additional threshold frequencies, the media guidance application returns to step 604. If the media guidance application determines not to compare the frequency of use to additional threshold frequencies, the media guidance application proceeds to step 624. At step 624, the media guidance application determines (e.g., via control circuitry 304 (FIG. 3)) to present the icon on the second device.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for presenting customized options on second screen devices, the method comprising:
   determining, using control circuitry, a first device is currently generating for display a user interface that includes a plurality of options for performing a media guidance application operation;
   determining an importance level of each option of the plurality of options;
   storing, for each respective option of the plurality of options, a respective threshold frequency value of a plurality of threshold frequency values, wherein each of the plurality of threshold frequency values indicates a different predetermined minimum amount that needs to be met for causing an action to be performed, and wherein a magnitude of the respective threshold frequency value is selected to be stored for a respective option based on the importance level of the respective option;

determining, using the control circuitry, a frequency of use of an option of the plurality of options, wherein the frequency of use indicates how often the option was performed when available to a user at one or more previous times;

comparing, using the control circuitry, the frequency of use to the respective threshold frequency value for the option, wherein the respective threshold frequency value is greater than one; and in response to determining that the frequency of use exceeds the respective threshold frequency value, generating for display an icon, on a second device, for performing the option on the first device, wherein the second device is remote from the first device, and wherein the second device is connected to the first device via a communication network.

2. The method of claim 1 further comprising not presenting the icon in response to determining that the frequency of use does not exceed the respective threshold frequency value.

3. The method of claim 2 further comprising, in response to not presenting the icon, presenting a different icon associated with a different option of the plurality of options.

4. The method of claim 1 further comprising:
determining if a corresponding icon is generated for display in the user interface; and
removing the corresponding icon in the user interface in response to generating for display the icon on the second device.

5. The method of claim 4, further comprising prompting the user to confirm removal of the corresponding icon.

6. The method of claim 1, further comprising modifying a visual property of the icon based on the frequency of use.

7. The method of claim 6, wherein the visual property of the icon includes a brightness or a size of the icon relative to other icons on the second user device.

8. The method of claim 6, wherein the visual property of the icon includes an opaqueness associated with the icon.

9. The method of claim 1, wherein the frequency of use is based on a number of times that the icon was selected relative to a number of times that the user interface was previously accessed.

10. The method of claim 1, wherein the frequency of use is based on a length of time that the icon was not selected while presented to the user at one or more previous times.

11. A system for customizing functions of media guidance applications, the system comprising control circuitry configured to:
determine a first device is currently generating for display a user interface that includes a plurality of options for performing a media guidance application operation;
determine an importance level of each option of the plurality of options;
store, for each respective option of the plurality of options, a respective threshold frequency value of a plurality of threshold frequency values, wherein each of the plurality of threshold frequency values indicates a different predetermined minimum amount that needs to be met for causing an action to be performed, and wherein a magnitude of the respective threshold frequency value is selected to be stored for a respective option based on the importance level of the respective option;
determine a frequency of use of an option of the plurality of options, wherein the frequency of use indicates how often the option was performed when available to a user at one or more previous times;
compare the frequency of use to the respective threshold frequency value for the option, wherein the respective threshold frequency value is greater than one; and
in response to determining that the frequency of use exceeds the respective threshold frequency value, generate for display an icon, on a second device, for performing the option on the first device, wherein the second device is remote from the first device, and wherein the second device is connected to the first device via a communication network.

12. The system of claim 11, wherein the control circuitry is further configured to not present the icon in response to determining that the frequency of use does not exceed the respective threshold frequency value.

13. The system of claim 12, wherein the control circuitry is further configured to, in response to not presenting the icon, present a different icon associated with a different option of the plurality of options.

14. The system of claim 11, wherein the control circuitry is further configured to:
determine if a corresponding icon is generated for display in the user interface; and
remove the corresponding icon in the user interface in response to generating for display the icon on the second device.

15. The system of claim 14, wherein the control circuitry is further configured to prompt the user to confirm removal of the corresponding icon.

16. The system of claim 11, wherein the control circuitry is further configured to modify a visual property of the icon based on the frequency of use.

17. The system of claim 16, wherein the visual property includes a brightness or a size of the icon relative to other icons on the second user device.

18. The system of claim 16, wherein the visual property of the icon is includes an opaqueness associated with the icon.

19. The system of claim 11, wherein the frequency of use is based on a number of times that the icon was selected relative to a number of times that the user interface was previously accessed.

20. The system of claim 11, wherein the frequency of use is based on a length of time that the icon was not selected while presented to the user at one or more previous times.

* * * * *